April 28, 1964   J. HOULDSWORTH   3,130,501
GAUGES FOR MACHINE TOOLS
Filed June 2, 1960
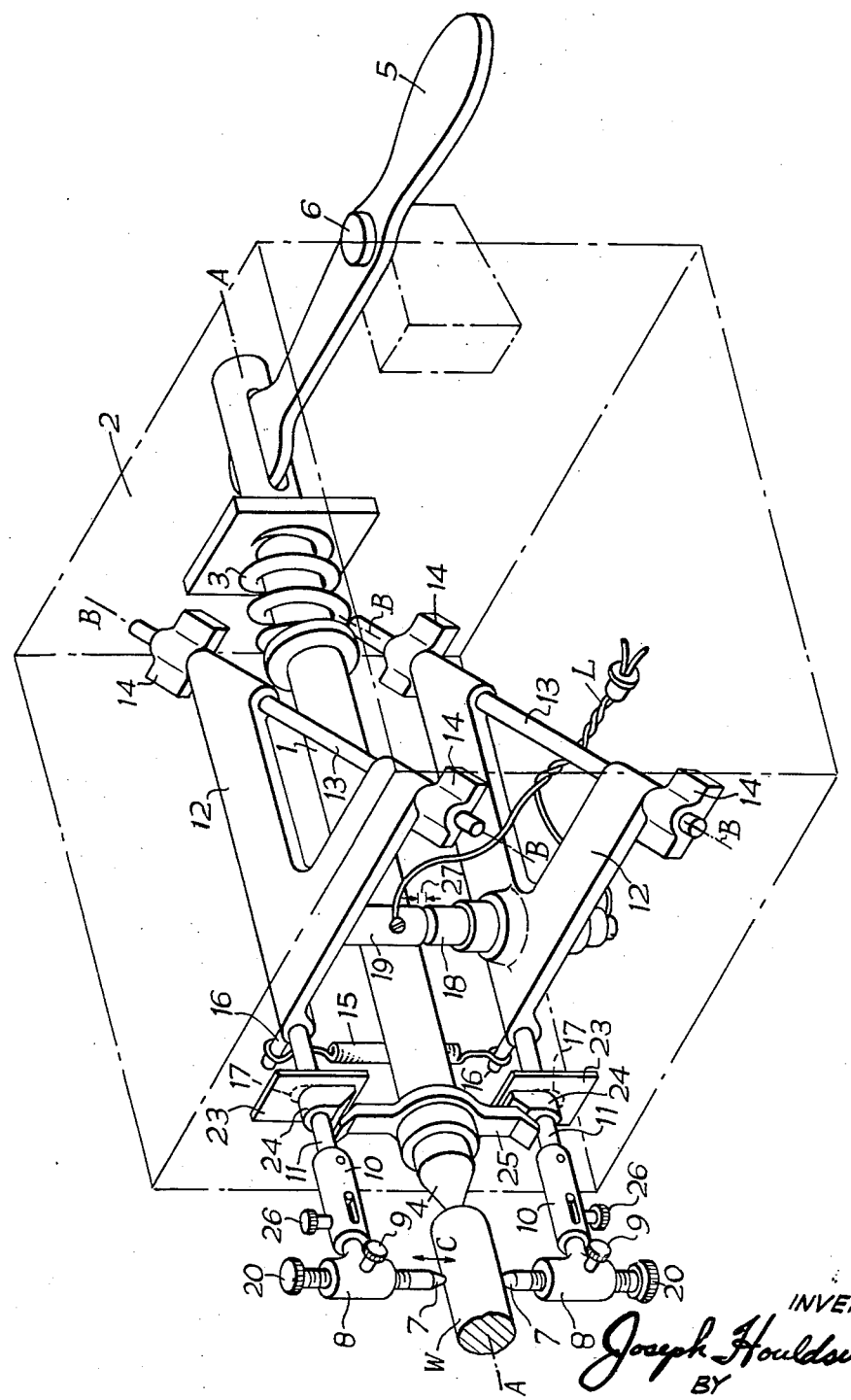
INVENTOR
Joseph Houldsworth
BY
Larson and Taylor
ATTORNEY United States Patent Office 3,130,501
Patented Apr. 28, 1964

3,130,501
GAUGES FOR MACHINE TOOLS
Joseph Houldsworth, 55 Lutterworth Road, Leicester,
England, assignor of one-half to A. A. Jones & Shipman
Limited, Leicester, England, a British company
Filed June 2, 1960, Ser. No. 33,586
Claims priority, application Great Britain June 16, 1959
3 Claims. (Cl. 33—149)

This invention relates to machine tools and is concerned with gauges mounted on such tools and used to check the dimensions of the work continuously or at specified times during a machining operation, this operation being terminated either manually or automatically when the workpiece is of the required dimensions indicated by the gauge.

The invention is particularly applicable to gauges for use in measuring the diameter of the work in a cylindrical grinding machine and will, for convenience, be described hereafter in this connection, it being understood that the invention is applicable to other types of machine tools.

Conventional gauges for measuring the diameters of workpieces usually comprise two jaws, points or feelers (hereinafter referred to for convenience as feelers) which are relatively movable to caliper a workpiece and are supported by a frame or box containing a measuring mechanism arranged to be actuated by movement of the feelers relatively to one another. The gauge is conventionally movable relatively to the workpiece, from an operative position calipering the workpiece to a retracted position allowing insertion of a new workpiece into the machine, the gauge being suitably mounted for this purpose. In one type of gauge, generally known as the "hook" type and usually having three feelers, at least one of which is adjustable, the gauge is mounted upon a swing arm, whilst in another type the gauge is mounted upon a slide movable along a slideway on the machine table.

In these conventional gauges the dimensions of the gauge frame or box, and hence also the measuring mechanism therein, are limited. For example, this frame or box must be sufficiently small to allow gauging of workpieces of short length where the workhead and tailstock supporting the workpiece are close together. Because of these essential small dimensions such gauges are limited in strength and rigidity.

A further disadvantage of such gauges is the need to move them bodily with the measuring mechanism thereof to allow insertion or removal of a workpiece. Such movement may effect the accuracy of the gauge, e.g. during successive operations, and this is a fatal shortcoming in very high precision work, for example where it is desirable to have a high accuracy gauge reading to within a few millionths of an inch.

The present invention has been evolved with the aim of overcoming these disadvantages.

To this end, an object of the present invention is the use, in a machine tool, of a workpiece gauge comprising at least one feeler arranged for contacting a workpiece at a gauging zone thereof, this workpiece being rotatably mounted between end supports, for example a workhead and tailstock center or collets or chucks, and a mechanical carrier device upon which the feeler is mounted, said carrier device being movably attached to an end support and mounted within the area or space, extending away from the workpiece, normally associated with the bodywork of the support, such movable attachment allowing the feeler to follow changes in the workpiece diameter, or to be placed in or out of contact with the workpiece, and to be associated with a measuring mechanism adapted to evaluate the movement of the feeler and the said carrier device.

In a very suitable arrangement the gauge can comprise two feelers of this character, these being placed and adapted to contact and caliper the workpiece across a diameter and, by means of the mechanical carrier devices supporting the feelers, to transfer information on the state of the workpiece diameter to a measuring mechanism located within a structure, for instance a workhead or a tailstock, supporting the workpiece.

A further object is a guage for the intended purpose comprising feelers arranged for contacting work, mounted between end supports in the machine, at a gauging zone thereof, at least one of these feelers being movable to and from contact with the work by a mechanical carrier device which is mounted and pivotable on the opposite side of one of said supports from the work and is there operatively associated with a measuring mechanism adapted to evaluate the gauging movement of said movable feeler.

Yet another object is a workpiece gauge comprising at least two relatively movable feelers, both supported from a work-supporting structure, these feelers being adapted to contact the work at spaced positions on the latter thereby to actuate a measuring mechanism located within said work-supporting structure.

Seen from another aspect the gauge according to the present invention may be regarded as comprising a measuring mechanism permanently installed in or on a work-supporting structure, for example a tailstock or a workhead, and at least two relatively movable feelers disposed for contact with the work and coupled to the measuring mechanism so as to communicate the work-gauging movements remotely thereto.

The principle is that the measuring mechanism of the gauge can be permanently disposed close to the work support and, by the provision of an appropriately-adjustable transmission between the feelers and this mechanism, the gauge as a whole need not be moved bodily to allow the workpiece to be withdrawn from or inserted into the machine, thereby avoiding disturbance of the measuring mechanism. This arrangement also has the advantage that there is sufficient room away from the vicinity of the work, and particularly in a tailstock or workhead, for the measuring mechanism to be of larger size and hence of stronger construction than was possible hitherto.

Further, any distortion of the position of the work support due, for example, to temperature variations, will be reflected by a corresponding movement of the feelers, and thus not give rise to false readings.

Each of the feelers is conveniently carried by an arm which passes into an adjacent work-supporting structure and is there carried by a carried device, at least one of these devices being pivotable about a fixed axis, which may be oblique to that of the arm.

The carrier devices referred to, which may in one instance be in the form of triangular plates, will conveniently carry cooperating elements of a measuring mechanism sensitive to variations in spacing between said elements in response to contact-testing of the work by the feelers. Thus, the position of each feeler will be indicated by the inclination of the respective plate. The measuring mechanism will be mechanically, electrically, or pneumatically operated.

In one advantageous arrangement, however, and where there are two feelers arranged to contact the work from opposite sides, the measuring mechanism is of an electric capacitative type, having electrodes extending towards one another from the carrier devices thereof and parallel to the corresponding feelers, and having a condenser for evaluating the dielectric capacity in the gap between these electrodes. This parallelism of the feelers and electrodes is found further to contribute to accuracy of measurement.

The variation of capacity caused by the changing width of the gap, as the workpiece is reduced by machine operations, may be used to operate an indicator or meter which can be calibrated to show the actual change in size of the workpiece. Electrical signals, emitted at preselected states or stages of workpiece size, can also be provided to control the rate and termination of the workpiece reducing operation. It will be appreciated that similar indicators and/or controls can be used for other types of measuring mechanism.

In any event, provision will conveniently be made for adjusting the effective setting of the feelers.

To remove a workpiece from the machine the gauge is not necessarily opened further, i.e. the opposed feelers need not be withdrawn in directions away from one another. After removal of a workpiece, the gauge will normally close automatically, i.e. the feelers will move closer together, and will require to be opened to allow insertion of a new workpiece. It is manifest that when a new workpiece of round cross-section is inserted it can urge the gauge open. Preferably, however, the gauge of the invention has associated therewith means for automatically retracting the feelers in response to the retraction of the adjacent work support in unloading or loading a workpiece, thus avoiding unnecessary wear upon the feelers and the possibility of disturbing the gauge setting. Such means may conveniently be coupled with means for withdrawing one of the work-supporting centres in a machine whereby the gauge is opened automatically as the said centre is withdrawn to allow insertion or removal of a workpiece.

Referring now to the accompanying drawing, which is given by way of example and is an isometric and diagrammatic view of a grinding machine tailstock equipped with a gauge in accordance with the present invention:

A conventional tailstock barrel 1, mounted within the tailstock body 2, is biassed, to the left in the drawing, by a compression spring 3 to urge the tailstock center 4 towards a cylindrical workpiece W which is supported at its opposite end by the center of a workhead (not shown). The common axis of the workpiece and tailstock barrel is designated A—A. The tailstock center 4 can be retracted, to allow withdrawal of the workpiece, by means of a lever 5 extending into an aperture in the tailstock barrel 1 and pivoted about a pin 6 on a projection from the body of the tailstock.

In accordance with the invention the tailstock is equipped with a gauge having vertically disposed feelers 7 contacting the workpiece from above and below at diametrically opposite sides. These feelers 7 are mounted in brackets 8 having a common vertical medial plane which is also shared by the workpiece center 4. Provision is made for adjusting the feelers vertically within the brackets by knobs 20, and for retaining them in adjusted positions by screws 9. Each bracket 8 is connected, through a telescopic joint 10, to an arm 11, extending through vertical slots 17 in the front wall of the tailstock body 2. The telescopic joints 10 allow adjustment of the feelers 7 in directions parallel to the axis of the workpiece, screws 26 being fitted for locking the joints after adjustment.

Each of the arms 11 is connected within the tailstock body 2 to one of two carrier devices in the form of plates 12 of generally triangular outline disposed one above the other and each pivotable on a spindle 13 rotatably supported by spaced blocks 14. The spindles 13 are in vertical register and each has its axis B—B in a horizontal plane and at an angle to the axis A—A.

The plates 12, and hence also the feelers 7, are urged towards one another by means of a tension spring 15 anchored at opposite ends to projections 16 from the plates 12. Thus, in gauging the workpiece W during a grinding operation, movement of the feelers 7 closer together will result in the plates 12 being turned angularly about the axes B—B of the spindles 13. The degree of this angular movement of the plates 12 may be determined and indicated by any suitable means. In the present example, it is done by measuring the linear distance between a part of each of the plates 12 by means of an electric proximity gauge mechanism which works on the principle of electrical capacity measurement.

This gauge mechanism comprises cooperating elements in the form of a condenser 18 fixed on the lower plate 12 and a projection 19 attached to the upper plate 12 and measures the dielectric capacity of the air gap 27, thus determining the distance between the plates 12. The condensor 18 and projection 19 are connected by leads L to an indicating instrument and/or a device controlling the grinding operations.

An important feature of such electric proximity gauges is that the accuracy with which the distance between the two electrodes thereof can be determined varies inversely with this distance, i.e. the smaller the gap between these electrodes, the greater the accuracy. In this example, the gap 27 between the condensor 18 and the projection 19 is arranged to be at its minimum, and therefore its most accurate position when the finished diameter of the workpiece is reached, thus ensuring the maximum accuracy at the most critical point.

It will be apparent that movement of each of the feelers is not strictly rectilinear, but along an arc of large radius having its center on the relevant axis B—B. However, this deviation from the rectilinear is very slight for the short distance which the feeler moves and is of negligible eject.

Mounted on each of the arms 11 is a cover plate 23 adapted to cover the corresponding vertical slot 17 in the tailstock body and prevent the ingress of dust or moisture into the tailstock body, and to the measuring mechanism. Each of these plates 23 is formed with a ramp 24, and a cam bar 25 is carried by, and movable with, the tailstock barrel 1 so as to engage the ramps 24 and urge the plates 23, and hence the arms 11 and feelers 7 carried thereby, away from one another. In this way, when the barrel 1 is withdrawn rightwards (as viewed in the diagram) to allow withdrawal or insertion of a workpiece W, the gauge feelers are automatically opened, i.e. retracted.

It is to be noted that this description of the mechanisms involved is not to be regarded as binding in detail and refers only to the diagram provided for illustration. For instance, the axis B/B is not necessarily oblique to the axis A/A, the bearings for the moving arms may be more complex than the simple journal type shown, and the means for securing vertical and horizontal adjustment of the feelers with respect to the arms may not of necessity be limited to the simple rod and hole type shown in the diagram.

I claim:

1. In a machine tool having a workpiece supported, for rotation by at least one end support, an end support body, a workpiece gauge comprising at least one feeler for engaging said workpiece, at least one carrier extending substantially in the direction of the axis of the workpiece, means for mounting said feeler on said carrier, at least part of said carrier mounted within said end support body, means for moving said carrier whereby the feeler is permitted to follow dimensional changes in said workpiece, and ramp and cam means for automatically retracting the feeler in response to the retraction of an end support into said end support body in unloading and loading a workpiece.

2. A workpiece gauge according to claim 1, wherein the said part of said carrier comprises means rotatable about a fixed axis.

3. A gauge according to claim 2, in which the rotatable means carry cooperating elements of a measuring mechanism sensitive to variations in spacing between said elements in response to contact-testing of the workpiece by the feeler.

References Cited in the file of this patent

UNITED STATES PATENTS

| | | |
|---|---|---|
| 972,196 | Johnson | Oct. 11, 1910 |
| 1,835,807 | Parker | Dec. 8, 1931 |
| 2,397,795 | Lersch | Apr. 2, 1946 |